United States Patent
Janke et al.

(10) Patent No.: US 9,553,766 B2
(45) Date of Patent: Jan. 24, 2017

(54) DETERMINED CONFIGURATION UPDATE FOR EDGE COMPONENTS

(71) Applicant: SAP SE, Walldorf (DE)

(72) Inventors: Thomas Janke, Dresden (DE);
Alexander Claus, Dresden (DE);
Matthias Winkler, Dresden (DE)

(73) Assignee: SAP SE, Walldorf (DE)

( * ) Notice: Subject to any disclaimer, the term of this patent is extended or adjusted under 35 U.S.C. 154(b) by 225 days.

(21) Appl. No.: 14/570,650

(22) Filed: Dec. 15, 2014

(65) Prior Publication Data
US 2016/0173331 A1    Jun. 16, 2016

(51) Int. Cl.
| | |
|---|---|
| G06F 15/177 | (2006.01) |
| H04L 12/24 | (2006.01) |
| H04L 12/26 | (2006.01) |
| H04L 29/08 | (2006.01) |
| G06F 9/445 | (2006.01) |

(52) U.S. Cl.
CPC ............. H04L 41/0816 (2013.01); G06F 8/65 (2013.01); H04L 41/0846 (2013.01); H04L 43/04 (2013.01); H04L 43/08 (2013.01); H04L 67/2823 (2013.01); H04L 67/34 (2013.01)

(58) Field of Classification Search
CPC ...... H04L 43/04; H04L 41/14; H04L 41/0816; H04L 41/022
USPC ......................................................... 709/221
See application file for complete search history.

(56) References Cited

U.S. PATENT DOCUMENTS

2016/0094421 A1*   3/2016   Bali ....................... H04L 43/04
                                                                 709/223

\* cited by examiner

*Primary Examiner* — Glenford Madamba
(74) *Attorney, Agent, or Firm* — Jones Day (57) ABSTRACT

A method, device, system, and computer program product that relate to configuration of an edge component and subcomponents to adapt data from a Device to a readable form and to communicate the adapted data to a Network End Environment. The Network End Environment includes a user interface by which a user requests that the edge component is updated to have a configuration version stored at a source. The system processes the request and updates the edge component configuration. The edge component is updated to a source configuration at a predetermined time interval according to one of a full configuration refresh or a delta configuration. Data received and processed by the edge component can thereafter be pushed to the Network End Environment for storage and/or use in a Network application. The edge component is described as a Connector, and the subcomponents of the edge component are described as Connector components.

11 Claims, 8 Drawing Sheets

Source Configuration 602

Monitored Folder * 608
/opt/sap/iot/transfer

Check Interval * 610
5

Check Interval Unit 612
○ ms  ● s  ○ min

Document description * 614
machine_43

Target Configuration 604

Server URL * 616
https://backendserver.com/messaging/cmis/json

Path within repository 618
machineData

Use Credentials
□

User Name * 620

Password * 622

Proxy Configuration 606

Use Proxy 624
☑

Proxy Host * 626
proxy

Proxy Port * 628
8080

Fig. 7

DETERMINED CONFIGURATION UPDATE FOR EDGE COMPONENTS

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyrights whatsoever.

FIELD

A method, device, system, and computer program product that relate to updating the configuration of edge components such that any one of a set of Devices can efficiently interact and interface with a Network Based Environment; and in addition, the invention relates to a Network interfacing with the Devices by updating the configuration in a local customer environment.

BACKGROUND

In software development environments, developers must design, install, configure, and test software applications such that Devices can interface with a Network Based Environment. In so doing, a developer must be aware of a variety of different Devices and how data is formatted when output from these Devices. Each of the different Devices can have a different number of output signals, which provide different units of data, and which must be quantified in different ways to be recognized as meaningful information by the Network Based Environment. Accordingly, for each of these different Devices it is customary to have a configuration tool. The configuration tool for one Device is different than a configuration tool used for a different Device. The configuration tools allow the Devices to be configured in a way that they can send data in a meaningful manner to the Network Based Environment.

A different configuration tool for interfacing between the Device and the Network Based Environment is required for each different type of Device. A configuration tool requires at least one of different software plug-ins, different back-end environments to handle data received from the Devices, and different device adapters for the different Devices. Therefore, configuration tools are packaged differently in a software development environment for a respective variety of Devices. Utilizing a variety of different configuration tools to interface with numerous devices is often cumbersome in terms of volume (e.g., quantity), implementation, and size (e.g., memory). Moreover, updating the configuration tools whenever a particular application requires an interface with a specific Device can be annoying and/or time consuming for the customer, especially when the customer expects a software development environment to be as complete as possible.

Accordingly, there is a need for development of a device, a system, a method, and a computer program product to configure edge components to provide an updateable interface between Devices and a Network Based Environment. There is also a need for such a configuration to be performed in a fast, efficient, and reliable manner across a variety of Devices and Network.

DETAILED DESCRIPTION

Example embodiments of the present invention provide a method, device, system, and computer program product for configuring data received from at least one Customer External Device to interface with a Network End Environment. An edge component is coupled to receive output from at least one Customer External Device. Upon receipt of the output, the edge component manipulates the output such that it is readable data for use later on in a Network End Environment. The edge component is further coupled to the Network End Environment such that the output of the edge component, including the readable data, is transmitted to the Network End Environment for storage or manipulation according to a Network application. An edge component is a system element that runs, or is connected to, the edge of the system where the at least one Customer External Device is located. The edge component is the system element that provides what is otherwise described as a bridge, gateway, or portal between the at least one Customer External Device and the Network End Environment. Edge components facilitate communication in the Internet of Things (IoT) industry. In an example embodiment, edge components have utility in providing connectivity with the SAP HANA platform, IoT Edition as the Network End Environment. According to an example embodiment, a Connector is applied as an edge component. A Connector has a particularized configuration and component configuration as described herein, but it should be noted that the breadth of edge component connectivity platforms extends beyond the scope of the described Connector.

When the at least one Customer External Device is changed or updated it is likely that at least one of the Connector configuration and a configuration of a component within the Connector configuration must be updated. At regular intervals the Network End Environment, which stores configuration information for the Connector and its components, provides configuration update information to the Connector. The Connector is then able to implement this specific configuration update to successfully interact with the at least one Customer External Device. According to an example embodiment, the configuration update information made available to the connector includes only information that has changed since the previous update. Accordingly, the Connector is not required to receive an entirely new Connector configuration and/or Connector component configuration from the Network End Environment.

Figure 1:
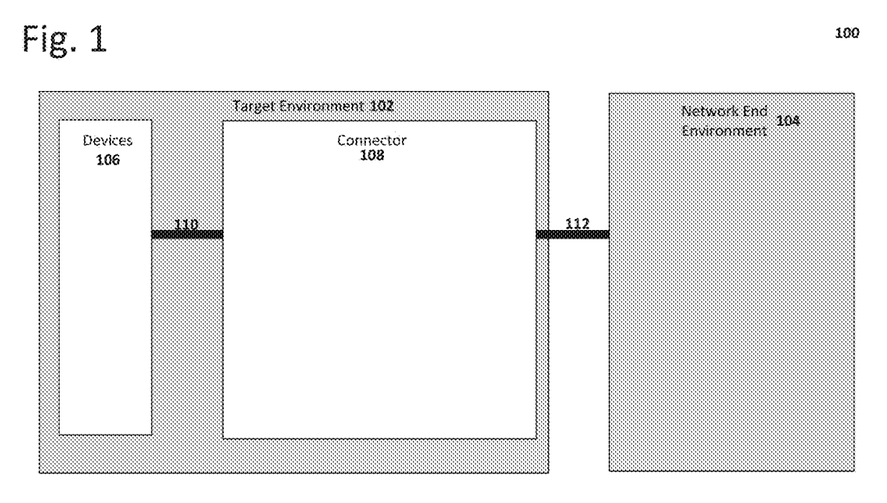
FIG. 1 illustrates a system 100 in which an edge component processes data received from at least one Device to interface with a Network according to an example embodiment.

FIG. 1 illustrates a system 100 in which an edge component processes data received from at least one Device to interface with a Network according to an example embodiment.

The system 100 includes two subsystems, Target Environment 102 and Network End Environment 104. Target Environment 102 further includes at least one Customer External Device (Device) 106 and an edge component. In this example embodiment, the edge component is a Connector 108. The at least one Device 106 is connected to the Connector 108 by a communication connection 110. In an example embodiment, communication connection 110 is one of a wired connection or a wireless connection. Data provided from the at least one Device 106 to the Connector 108 over the communication connection 110 includes any one of sensor data, an alarm, and a device status. The Connector 108 receives the data from the Device 106 over the communication connection 110. In an example embodiment, the Connector 108 retrieves the data over the communication connection 110 from the at least one Device 106. The Connector 108, if necessary, proceeds to apply data processing. The Connector 108 is capable of running on any computing device, such as an industrial personal computer (IPC). After having received the data from the Device and after having processed the data, the Connector channels the data over a second communication connection 112 to the Network End Environment 104. In an example embodiment, second communication connection 112 is one of a wired connection or a wireless connection. Data provided from the Connector 108 to the Network End Environment 104 is either processed or unprocessed data regarding at least any one of sensor data, an alarm, and a device status. The Connector 108 sends the data over the second communication connection 112 to the Network End Environment 104. In an example embodiment, the Network End Environment 104 retrieves the data over the second communication connection 112 from the Connector 108. Once the data is available to the Network End Environment 104, the data is at least one of stored, implemented, and made available for end user applications by the Network End Environment 104 to make use of the gathered data from the at least one Device.

Figure 2:
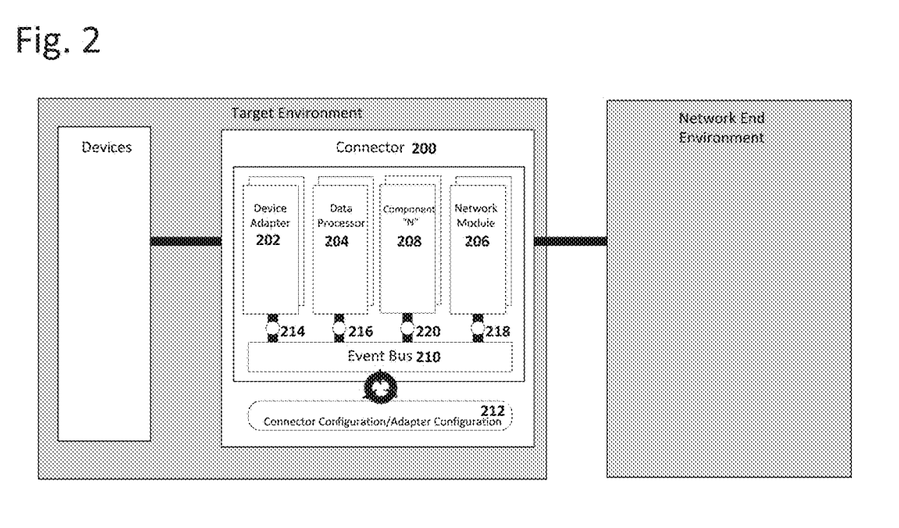
FIG. 2 illustrates an edge component, Connector 200, that processes data received from at least one Device to interface with a Network according to an example embodiment.

FIG. 2 illustrates an edge component, Connector 200, that processes data received from at least one Device to interface with a Network according to an example embodiment.

Connector 200 is a runtime component hosted on an execution environment. The execution environment can be one of a Windows environment, a Windows Embedded environment, a Linux environment, an OSX environment, and any similar environment known to one of ordinary skill in the art. The architecture for the execution environment is selected to be one of x86, ARM, or a similar architecture known to one of ordinary skill in the art. The runtime component Connector 200 and its execution environment are implemented in software. The software is hosted on a processing device having a memory component in Random Access Memory (RAM). The software is written in code that is executable by a processor. In an example embodiment, the Connector is implemented in hardware. The Connector 200 does not have a GUI and instead the updating of the Connector software is initiated by commands from the Network End Environment. In an example embodiment, the operating system in which the Connector is installed has a GUI.

The Connector 200 comprises three components: a Device Adapter 202, a Data Processor 204, and a Network Module 206. In an example embodiment, the Connector includes components in addition to the Device Adapter 202, the Data Processor 204, and the Network Module 206, such as component "N" 208. In an example embodiment, the Connector does not include all three of the three described components. The Connector 200 runs on an edge, meaning that its deployment is co-located with connected Devices.

A first Connector Component, the Device Adapter 202 component, interfaces directly with the communication connection 110. Communication connection 110 provides data from the at least one Device 106 to the Device Adapter 202. Device Adapter 202 includes a device agent. The device agent is executable on the Device Adapter 202 component of the Connector 200 and provides interfaces that are missing for specific Devices. A Device Adapter 202 component can, in an example embodiment, be a third party software element integrated into the Connector 200. When the Device Adapter 202 used is a third party software element, the Connector 200 includes an additional capability to interface with the third party software element. Output is provided by the Device Adapter 202 on a local communication connection 214 to other components of the Connector. Local communication connection 214 is bidirectional. In an example embodiment, the Device Adapter 202 has the capacity for bidirectional communication with the at least one Device 106.

A second Connector Component, the Data Processor 204 component, parses and filters the data received from the Device Adapter 202. The Data Processor 204 persists data received from the Device Adapter 202 over the local communication connection 216. Data received from the Device Adapter 202 and other sources is aggregated by the Data Processor 204 over a predetermined period of time. Data received from the Device Adapter 202 is sent over local communication connection 214, a communication bus, and second local communication connection 216 to the Data Processor 204. Second local communication connection 216 is bidirectional. Information is retrieved by the Data Processor 204 over local communication connection 214 and second local communication 216. According to an example embodiment, the Data Processor 204 includes, or interacts with, at least one processing device. In an example embodiment, the Data Processor 204 includes a plurality of processing devices and a subset of the plurality of the processing devices are implemented depending on the characteristics of the applicable Devices. The Data Processor 204 performs parallel processing of the same data over different processing devices. In an example embodiment, the Data Processor 204 performs parallel processing of the same data over the same processing device. In an example embodiment, the Data Processor 204 performs parallel processing of different data over different processing devices, with one processing device implementing an at least one function on a unique set of data. In an example embodiment, the Data Processor 204 performs parallel processing of different data over the same processing device. The processing performed by the Data Processor includes traditional pre-processing. For example, pre-processing can include signal converters suitable for an analog-to-digital conversion such as a pulse code modulation, an oversample, a decimation filter, a noise filter, or a filter implemented to perform particular spectral shaping. Analog-to-digital conversion includes both manipulations that convert analog signals into digital signals and that convert digital signals into analog signals. Data Processor 204 is also capable of implementing a delay for at least some of the data received/ retrieved from the local communication connections. After having processed the data received from the Devices, the Data Processor 204 provides output over second local communication connection 216 to other components of the Connector.

A third Connector Component, the Network Module 206 component, implements Network protocols such that the received/retrieved data and/or the data processed by the Data Processor 204 can be sent as a data packet to a Network End Environment 104. The Network protocol used is one of Message Queue Telemetry Transport (MQTT), Hyper Text Transfer Protocol (HTTP), Secure Hyper Text Transfer Protocol (HTTPS) and Sockets Direct Protocol (Sockets). The Network protocol is used to communicate between the Network Module 206 and the Network End Environment 104. A third local communication connection 218 by which it accepts input from the other components of the Connector. Third local communication connection 218 is a bidirectional connection. Network Module 206 requests input from one of the Data Processor 204 component, the Device Adapter 202 component, and the Nth component, over the third local communication connector 218. Network Module 206 then provides output for transmission over the second communication connection 112 to the Network End Environment 104.

All of the components of the Connector, including any of the Network Module 206, the Data Processor 204, the Device Adapter 202, and Component "N" 208, communicate with one another over an event bus 210 of the Connector 200. The event bus 210 is coupled to each of the local communication connection 214, the second local communication connection 216, the third local communication connection 218, and the Nth local communication connection 220. In an example embodiment, the event bus incorporates all of the local communication connection 214, the second local communication connection 216, the third local communication connection 218, and the Nth local communication connection 220. The event bus 210, in its communications with the components of the Connector, has multiple channels of communication. Event bus 210 performs bidirectional communication.

The event bus 210, which is also herein referred to as a message bus, is used to send and receive messages between the different components, such as the Network Module 206, the Data Processor 204, the Device Adapter 202, and Component "N" 208. Within the component sending the message, there is a validation procedure. The component sending the message validates the messages in a manner specific to a type of the message. In an example embodiment, the component receiving the message executes another validation procedure. The component receiving the message will validate the messages according to the type of the message. The validation procedure of the component changes on a component by component basis. Each component has its own validation procedure, which is set by an initial configuration, or a most recent configuration, of the components. Based on the configuration, the Connector 200 registers specific components as listeners to the message bus. Therefore, components will only receive messages that they support, according to their configuration.

Connector 200 further comprises a connector configuration portion 212. The connector configuration portion 212 interfaces with the components of the Connector. The connector configuration portion 212 requests a configuration update from the Network End Environment 104. The connector queries the Core Device Configuration for a configuration update from the Network End Environment 104. In so doing, the Connector 200 sends a status update to the Network End Environment 104 configuration portion. The Connector 200 also sends a query to retrieve component binaries data. In another example embodiment, the Connector 200 sends a query to retrieve a connector configuration from the Core Device Configuration. In another example embodiment, the Connector sends a query to retrieve component configuration data from the Core Device Configuration. In an example embodiment, the connector configuration portion 212 receives, from the Network End Environment 104, a configuration update. According to an example embodiment, a query sent from the Connector to the configuration portion of the Network End Environment 104 can include multiple requests at one time.

The Connector 200 queries the configuration portion of the Network End Environment 104 for the Connector configuration, or a component of the Connector configuration, in one of at least two ways. According to a first example embodiment, the Connector 200 retrieves from the Core Device Configuration a full configuration request. A full configuration request occurs when the Connector 200 queries the Core Device Configuration for all configuration operations necessary to obtain the most current configuration as stored in the Core Device Configuration. In response, the Connector 200 receives all configuration operations necessary to obtain the current configuration from the Core Device Configuration. According to a second example embodiment, the Connector 200 retrieves from the Core Device Configuration a delta configuration update. A delta configuration update occurs when the Connector 200 runs with a certain predetermined or previously implemented configuration and then queries the Core Device Configuration for those operations necessary to update the current configuration on the Connector 200 to the state as currently stored in the Core Device Configuration. In response, the Connector 200 then receives only the configuration operations necessary to update the current configuration on the connector to the state stored in the Core Device Configuration.

A user can implement one of a full configuration refresh or a delta configuration update by interacting with the Workbench, as described herein. During a component configuration update the Connector 200 downloads component binary files from the Core Device Configuration to obtain component runtime code. In an example embodiment, the component binary files downloaded from the Core Device Configuration are Java archive (JAR) files.

Figure 3:
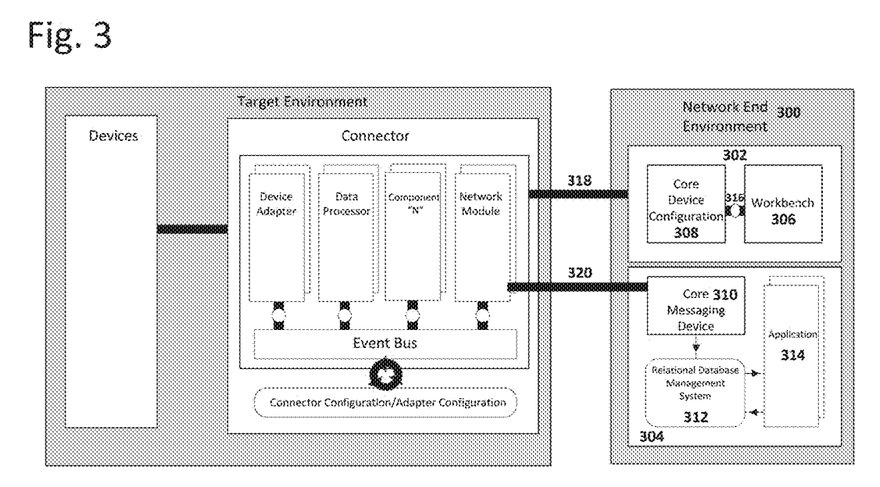
FIG. 3 illustrates a Network End Environment 300 for use in edge component configuration according to an example embodiment, in which the Network End Environment includes a configuration component and a data component.

FIG. 3 illustrates a Network End Environment 300 for use in edge component configuration according to an example embodiment, in which the Network End Environment includes a configuration component and a data component.

The Network End Environment 300 includes two sub-environments, a Configuration Environment 302 and a Data Environment 304. In an example embodiment, the Network End Environment 300 is the SAP HANA platform, IoT Edition. The Network End Environment 300 stores data received through the edge component. In an example embodiment, the edge component is the Connector 200. The Network End Environment 300 also manages the configuration process as necessary through configuration updates of the Connector 200.

The Configuration Environment 302 includes a Workbench 306 and a Core Device Configuration 308. Workbench 306 is essentially a user interface. The Core Device Configuration 308, which is coupled to the Workbench, is used to store the connector configuration of the Connector 200 and is also used to provide the connector configuration to the Connector 200.

The Data Environment 304 includes a Core Device Messaging System 310, a database 312, and at least one application 314. Upon receipt of data at the Core Device Messaging System 310, the data is transformed into an appropriate message and transferred to the database 312 for storage. In an example embodiment, the database 312 is a HANA database. Upon the storage of data in the database 312 the data is made generally available to at least one application 314 that is hosted on the Network End Environment 300. An application 314 will query the database 312 for relevant data, and the application 314 will retrieve the relevant data. As an example, an application that would query the database 312 for relevant data could be a "Predictive Maintenance" application or a "Remote Service Management" application. The at least one application 314 does not need to be part of the Network End Environment 104 platform. Instead, the at least one application 314 can be instantiated so that it accesses data from the database 312 through the Core Device Messaging System 310 or another interface.

Figure 4:
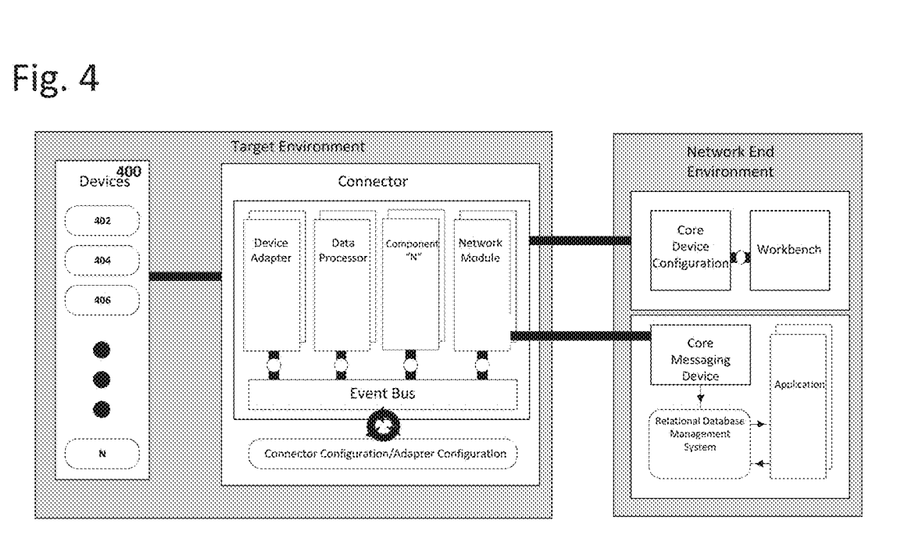
FIG. 4 illustrates a Device 400, for use in edge component configuration, that includes at least one Device having its status read by an edge component according to an example embodiment.

FIG. 4 illustrates a Device 400, for use in edge component configuration, that includes at least one Device having its status read by an edge component according to an example embodiment.

The at least one Device 400 can be any one of sensors, alarms, and independent devices having outputs. In an example embodiment, only one Device 402 is connected to the edge component, which in this embodiment is Connector 200, over the communication connection 110. In an example embodiment, more than one Device (e.g., 402, 404, 406, . . . , N) is connected to the Connector 200 over the communication connection 110.

Figure 5:
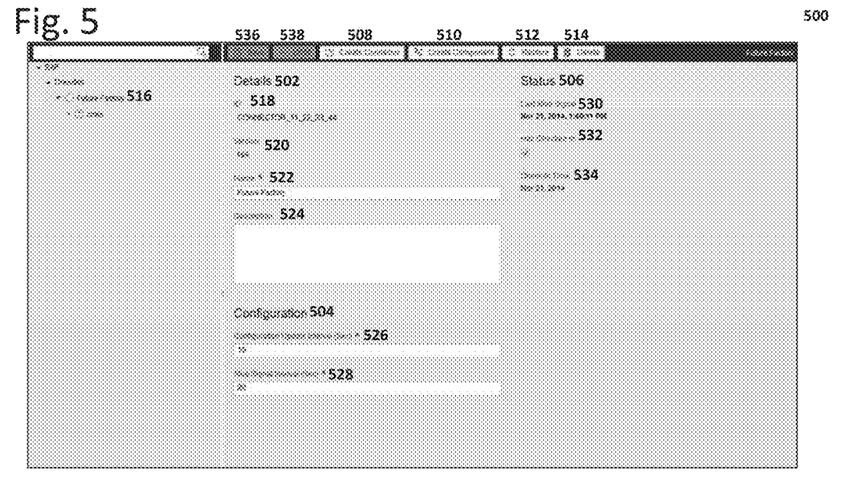
FIG. 5 illustrates a graphical user interface (GUI) of a Workbench 500 that is available on the Network End Environment for use in edge component configuration according to an example embodiment.

FIG. 5 illustrates a graphical user interface (GUI) of a Workbench 500 that is available on the Network End Environment for use in edge component configuration according to an example embodiment.

The GUI of the Workbench 500 provides the user of the Workbench with several options for manipulation of the connector configuration. The GUI of the Workbench, itself, can be made available to a user in different ways. In an example embodiment, the GUI of the Workbench is available to the user over a browser-based connection to the Network End Environment 104. In an example embodiment, the GUI of the Workbench is available to user over software implemented in a specific hardware environment communicatively coupled to the Network End Environment 104.

The GUI of the Workbench provides the user with the functionality to upload software to the edge component. FIG. 5 illustrates an embodiment in which the GUI of the Workbench provides the use with the functionality to upload components to running instances of the Connector. The user uses item 510 to upload new device adapters to the configuration connection of the Connector such that new interfaces can be implemented. In addition, the user uses item 510 to upload or adjust the data processing performed on the data received from the device adapter within the Connector.

The GUI of the Workbench further provides the user with a field that starts, or initializes components. The GUI of the Workbench further provides the user with a field that stops components.

The user can further use the GUI of the Workbench to execute a change in the configuration of the components. A user is able to detail the changes in the configuration that are demonstrated on the GUI of the Workbench, and then, after user review, the altered configuration is then analyzed for changes as compared to the current configuration on the Connector. Core Device Configuration will then execute the commands set by the user at the Workbench and alter the connector configuration in place on the Connector.

The user to further use the GUI of the Workbench to monitor the state of a component. A user views the GUI and determines whether or not a component has been started, whether or not a component has been stopped, and whether or not an error has been generated. According to an example embodiment, a user can create a Connector according to the following, which is initiated upon user selection of the create connector 508 item. In an example embodiment, a user can create a component of the Connector by selecting the create components 510 item. To undo a recent action, a user selects item 538. To save a created Connector component, a user selects item 536. In a case in which there is an error, or in which the Connector is in an inconsistent state such as when the Workbench is not synchronized with the Connector, the Connector is restored to a recent configuration. The recent configuration is the configuration having the state that is stored in the Core Device Configuration. To perform such a restore, a user selects item 512. To delete a created Connector or component of a Connector, the user selects the desired Connector or component form the side panel and then selects delete item 514.

All data generated by the Workbench in order to present a GUI to the user is stored in the Core Device Configuration. Accordingly, in an example embodiment the Core Device Configuration has a memory component. In an example embodiment, the Connector requests, at runtime, the configuration from the Core Device Configuration. In another example embodiment, the Core Device Configuration provides the configuration to the Connector at runtime. In an example embodiment, at runtime, components can be any one of started, stopped, reconfigured, updated and replaced at runtime.

According to an example embodiment, the GUI of Workbench 500 has at least three sections: a Details Section 502, a Configuration Section 504, and a Status Section 506.

The Details Section 502 of the Workbench 500 includes a set of features such as at least some of the following.

Workbench 500 is capable of interfacing with a plurality of connectors. Each of the connectors is therefore assigned a connector ID as shown in 518. The Workbench 500 displays the version of the connector implemented as shown in 520. In an example embodiment, if versioning of the connectors is not enabled, then the version field is marked as "N/A". The Workbench 500, in an example embodiment, names each of the plurality of connectors. In an example embodiment, the name of the connector is automatically generated. In another embodiment, the Workbench requests that the user provide a name each available connector, as shown in 522 and at a side panel as 516.

The GUI of the Workbench 500 provides the user with a flexibility to monitor the state of the Connector.

The Status Section 506 of the Workbench 500 can include a set of features such as at least some of the following.

The control visible in the Status Section 506 demonstrates the vitality of the Connector, meaning when the last "alive signal" was received from the Connector, as shown in item 530 of FIG. 5. A large time gap demonstrates to the user that the system is currently not providing updates to the Connector and also possibly provides a warning to the user that the system is not functioning properly.

According to an example embodiment, the Connector is demonstrated as already configured by the Workbench. The status of the configuration is therefore marked as "checked in" as shown in 532 of the FIG. 5. The Workbench 500 can also provide details to the user regarding the time that the connector was checked-in, as shown in 534 of FIG. 5.

The GUI of the Workbench 500 provides the user with an ability to execute and review a configuration of at least one of a Connector and a Connector Component.

The Configuration Section 504 of the Workbench 500 can include a set of features such as at least some of the following.

In an example embodiment, the user can set the configuration update intervals for the Connector as displayed in 526. The units for the update intervals can be preset to a time frequency, for instance, seconds. By so doing, the user sets the polling interval that is used by the Connector to check for configuration updates. In another embodiment, the update interval set by the user determines the interval by which the Network End Environment checks to determine if the changed configuration must be updated to the Connector.

As stated above, a user can implement one of a full configuration refresh or a delta configuration update by interacting with the Workbench. An instruction instituted by the Core Device Configuration advises the Connector how to proceed with the updating of the configuration, including whether the update is for the connector configuration or for the configuration of a connector component.

The Connector can be configured in accordance with one of the following operations instituted by the Core Device Configuration: RESET_CONNECTOR, RESTART_CONNECTOR, and UPDATE_CONNECTOR.

According to an example embodiment, the instruction instituted by the Core Device Configuration is a RESET_CONNECTOR operation. When the RESET_CONNECTOR operation is executed, the Core Device Configuration advises the Connector to reset to its default, factory settings, state. By doing so, the Connector keeps its onboard information. Upon implementation of the RESET_CONNECTOR, no configuration components are available in the Connector and all fields are reset to defaults. The data fields reset to defaults include at least one of the update interval, the startup update interval, the startup-update enablement, and the alive-signal interval. Although the RESET_CONNECTOR does not have any mandatory attributes, in an example embodiment, attributes are assignable to the RESET_CONNECTOR.

According to an example embodiment, the instruction instituted by the Core Device Configuration is a RESTART_CONNECTOR operation. When the RESTART_CONNECTOR operation is executed, the Core Device Configuration advises the Connector to restart. The restart will disconnect the Connector from the Network End Environment 104. After a restart is enabled and during the log-on process, previously entered credentials are authenticated against the Core Device Configuration automatically. Although the RESTART_CONNECTOR does not have any mandatory attributes, in an example embodiment, attributes are assignable to the RESTART_CONNECTOR.

According to an example embodiment, the instruction instituted by the Core Device Configuration is a UPDATE_CONNECTOR operation. When the UPDATE_CONNECTOR operation is executed, the Core Device Configuration advises the Connector to update its configuration settings to the provided values. The configuration portion of the Network End Environment 104 will send a notification over communication connection three to the Connector that such a connector configuration device is advisable. UPDATE_CONNECTOR has attributes that are mandatory to its operation. The mandatory attributes of the UPDATE_CONNECTOR can include any one of UPDATEINTERVAL, STARTUPDATEENABLED, and ALIVESIGNALINTERVAL. UPDATEINTERVAL is an attribute that is of an integer type, which describes the interval for the configuration update cycle according to a unit of time. According to an example embodiment, the unit of time is seconds. STARTUPDATEENABLED is an attribute that is of a Boolean type, which determines if the Connector should query for a configuration device immediately after each startup. ALIVESIGNALINTERVAL is an attribute that is of an integer type, which describes the interval for when the Connector sends its component status update cycle according to a unit of time. According to an example embodiment, the unit of time is seconds. The UPDATE_CONNECTOR, using UPDATEINTERVAL, STARTUPDATEENABLED, and ALIVESIGNALINTERVAL, advises the Connector to update its configuration settings to the provided values.

According to an example embodiment, the components of the Connector can be configured in accordance with one of the following operations instituted by the Core Device Configuration: ADD_COMPONENT_TYPE, DELETE_COMPONENT_TYPE, ADD_MESSAGE_TYPE, DELETE_MESSAGE_TYPE, ADD_SUPPORTED_MESSAGE_TYPE, DELETE_SUPPORTED_MESSAGE_TYPE, ADD_COMPONENT, UPDATE_COMPONENT_CONFIGURATION, UPDATE_COMPONENT_ACTIVE_STATE, UPDATE_COMPONENT_TYPE, and DELETE_COMPONENT.

According to an example embodiment, the instruction instituted by the Core Device Configuration is an ADD_COMPONENT_TYPE operation. When ADD_COMPONENT_TYPE is executed, the Core Device Configuration advises the Connector to download and install files containing the runtime code for the referenced component type. In an example embodiment, the files installed are component binaries, such as JAR files. The mandatory attributes of ADD_COMPONENT_TYPE can include any one of SYMBOLICNAME and VERSION. SYMBOLICNAME is an attribute that is of a string type, which describes the symbolic name of the component type. VERSION is an attribute that is of a version string (e.g., "x.y.z"), which is the version of the component type. ADD_COMPONENT_TYPE allows the addition of a new component type, which can include any one of the previously discussed component types such as device adapter, data processor, and Network module.

According to an example embodiment, the instruction instituted by the Core Device Configuration is a DELETE_COMPONENT_operation. When DELETE_COMPONENT_TYPE is executed, the Core Device Configuration advises the Connector to uninstall and delete the runtime code for the referenced component type. In an example embodiment, the files uninstalled are JAR files. The mandatory attributes of DELETE_COMPONENT_TYPE can include any one of SYMBOLICNAME and VERSION, which were both described above with regards to the ADD_COMPONENT_TYPE operation. DELETE_COMPONENT_TYPE is a counterpart to ADD_COMPONENT_TYPE. DELETE_COMPONENT_TYPE allows for the removal of a previously deployed component type, which can include any one of the previously discussed component types such as device adapter, data processor, and Network module.

According to an example embodiment, the instruction instituted by the Core Device Configuration is an ADD_MESSAGE_TYPE operation. When the ADD_MESSAGE_TYPE operation is executed, the Core Device Configuration advises the Connector to add the referenced message type to its internal message type repository. The mandatory attributes of the ADD_MESSAGE_TYPE can include any one of SYMBOLICNAME, VERSION, and SCHEMA. SYMBOLICNAME is an attribute that is of a string type, which describes the symbolic name of the message type. VERSION is an attribute that is of a version string (e.g., "x.y.z"), which is the version of the message type. SCHEMA is of Base64 encoded Extensible Markup Language (XML) string type, which describes the schema of the message type.

According to an example embodiment, the instruction instituted by the Core Device Configuration is a DELETE_MESSAGE_TYPE operation. When the DELETE_MESSAGE_TYPE operation is executed, the Core Device Configuration advises the Connector to delete the referenced message type from the internal message type repository. DELETE_MESSAGE_TYPE is a counterpart to the ADD_MESSAGE_TYPE. The mandatory attributes of DELETE_MESSAGE_TYPE can include any one of SYMBOLICNAME and VERSION, which were both described above with regards to the ADD_MESSAGE_TYPE operation.

According to an example embodiment, the instruction instituted by the Core Device Configuration is an ADD_SUPPORTED_MESSAGE_TYPE operation. When the ADD_SUPPORTED_MESSAGE_TYPE operation is executed, the Core Device Configuration advises the Connector to add the described supported message type to its internal message type repository. The mandatory attributes of ADD_SUPPORTED_MESSAGE_TYPE can include any one of COMPONENTTYPESYMBOLICNAME, COMPONENTTYPEVERSION, MESSAGETYPESYMBOLICNAME, MESSAGETYPEVERSION, INCOMING, OUTGOING, SYNCHRONOUS, ASYNCHRONOUS, RESPONSEMESSAGETYPESYMBOLICNAME, and RESPONSEMESSAGETYPEVERSION. COMPONENTTYPESSYMBOLICNAME is of string type, which describes the symbolic name of the component type. COMPONENTTYPEVERSION is of version string type ("x.y.z"), which describes the version of the component type. MESSAGETYPESYMBOLICNAME is of string type, which describes the symbolic name of the request message type. MESSAGETYPEVERSION is of a version string type ("x.y.z"), which describes the version of the request message type. INCOMING is of a Boolean type, which determines if receiving messages of the pending receipt type is supported. OUTGOING is of a Boolean type, which determines if sending messages of the pending sent type is supported. SYNCHRONOUS is of a Boolean type, which determines if messages of this type are supported in a synchronous way. ASYNCHRONOUS is of a Boolean type, which determines if messages of this type are supported in an asynchronous way. RESPONSEMESSAGETYPESYMBOLICNAME is of a string type, which is only mandatory if SYNCHRONOUS is 1, then the symbolic name of the response message type. RESPONSEMESSAGETYPEVERSION is of a version string type ("x.y.z"), which is only mandatory if SYNCHRONOUS is 1, then the version of the response message type.

According to an example embodiment, the instruction instituted by the Core Device Configuration is a DELETE_SUPPORTED_MESSAGE_TYPE operation. When the DELETE_SUPPORTED_MESSAGE_TYPE operation is executed, the Core Device Configuration advises the Connector to delete the referenced supported message type from the internal message type repository. The mandatory attributes of DELETE_SUPPORTED_MESSAGE_TYPE can include any one of COMPONENTTYPESYMBOLICNAME, COMPONENTTYPEVERSION, MESSAGETYPESYMBOLICNAME, and MESSAGETYPEVERSION. The mandatory attributes of DELETE_SUPPORTED_MESSAGE_TYPE were all described above with regards to the ADD_SUPPORTED_MESSAGE_TYPE operation. DELETE_SUPPORTED_MESSAGE_TYPE is a counterpart to ADD_SUPPORTED_MESSAGE_TYPE.

According to an example embodiment, the instruction instituted by the Core Device Configuration is an ADD_COMPONENT operation. When the ADD_COMPONENT operation is executed, the Core Device Configuration advises the Connector to create a component with the given id of the referenced component type, configure the referenced component type with the given configuration and start the component, if specified. The mandatory attributes of ADD_COMPONENT can include any of ID, SYMBOLICNAME, VERSION, CONFIGURATION, and ACTIVE. ID is an identifier, which identifies the component. According to an example embodiment, ID is automatically generated as a numeric value by the Core Device Configuration. In an example embodiment, ID is interpreted as a string type by the Connector. ACTIVE is of a Boolean type (1 or 0), which determines if the component has to be started immediately. CONFIGURATION is of Base64 encoded XML string type, which describes the initial configuration of the component. The mandatory attributes of SYMBOLICNAME and VERSION were both described above.

According to an example embodiment, the instruction instituted by the Core Device Configuration is an UPDATE_COMPONENT_CONFIGURATION operation. When the UPDATE_COMPONENT_CONFIGURATION operation is executed, the Core Device Configuration advises the Connector to update the configuration of the referenced component accordingly. The mandatory attributes of UPDATE_COMPONENT_CONFIGURATION can include any one of ID and CONFIGURATION. The mandatory configuration of ID and CONFIGURATION were both described above with regards to the ADD_COMPONENT operation.

According to an example embodiment, the instruction instituted by the Core Device Configuration is an UPDATE_COMPONENT_ACTIVE_STATE operation. When the UPDATE_COMPONENT_ACTIVE_STATE operation is executed, the Core Device Configuration advises the Connector to start (ACTIVE is 1) or to stop (ACTIVE is 0) the referenced component. The mandatory attributes of UPDATE_COMPONENT_ACTIVE_STATE can include any one of ID and ACTIVE, which were described above with regards to the ADD_COMPONENT operation.

According to an example embodiment, the instruction instituted by the Core Device Configuration is an UPDATE_COMPONENT_TYPE operation. When the UPDATE_

COMPONENT_TYPE operation is executed, the Core Device Configuration advises the Connector to update a component with the given ID of the referenced component type and configure it with the existing configuration and start it if specified. The UPDATE_COMPONENT_TYPE assumes that no changes were made to the configuration schema and no message types have been added/removed. The mandatory attributes of UPDATE_COMPONENT_TYPE can include any one of ID, SYMBOLICNAME, VERSION, and CONFIGURATION, which were each described above.

According to an example embodiment, the instruction instituted by the Core Device Configuration is a DELETE_COMPONENT operation. When the DELETE_COMPONENT operation is executed, the Core Device Configuration advises the Connector to stop and uninstall the referenced component. A mandatory attribute of DELETE_COMPONENT is ID. ID was describes above with regards to the ADD_COMPONENT operation. DELETE_COMPONENT is a counterpart to ADD_COMPONENT.

Figure 6:
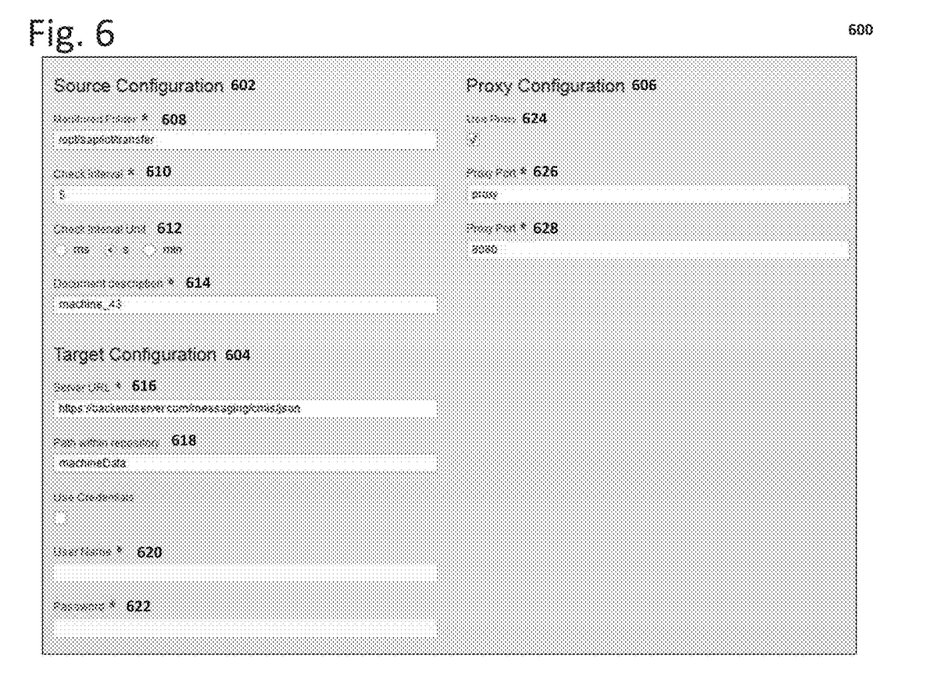
FIG. 6 illustrates a graphical user interface (GUI) from a Workbench 600 that is available on the Network End Environment for use in configuring a Connector Component according to an example embodiment.

FIG. 6 illustrates a graphical user interface (GUI) from a Workbench 600 that is available on the Network End Environment for use in configuring a Connector Component according to an example embodiment. According to an example embodiment, a component is configured by using the Workbench.

According to an example embodiment, the GUI of the Connector Component has three sections. In a first section 602, the GUI displays information regarding the source configuration. In a second section 604, the GUI displays information regarding the target configuration. In a third section 606, the GUI displays information regarding a proxy configuration. The GUI of the Connector Component can included all or less than all of the three sections. In an example embodiment, the information described as included in the three sections can be presented by the GUI in a form having all or less than all of the information from the three sections without the described section formatting. The formatting and structuring of the GUI is the same for each Connector Component. The GUIs of some Connector Components, in an example embodiment, are the same and some are different. According to an example embodiment, the formatting and structuring of the GUI is different for each Connector Component. The GUI of the Connector Component can be formatted and structured according to other information that would be known to one of ordinary skill in the art.

As an example, the configuration of the connector component may be configuration of a special component to monitor a folder on the computer in the user environment. Under the source configuration first section, the GUI provides information regarding the folder that is being monitored (e.g., 608). The GUI provides additional information regarding the interval at which the folder is being monitored (e.g., 610) and the unit of the interval (e.g., 612). The first section also includes a field (e.g., 614) that provides the user with an opportunity to describe the source configuration process.

Under the source configuration second section 604, the GUI provides information regarding the target to which data received from the device is being sent. For example, the target address to which information is sent could be in the form of a server URL (e.g., 616). The second section further describes the location, within the repository of the identified address of the target, where data is to be stored. In an example embodiment, the user can create a path by labeling a new path, as shown in 618, not yet instantiated in the repository. In another example embodiment, the user can identify a path within the repository from a preselected set of options. In order to access the target configuration, and to save to the repository, the target device on the Network could have security and/or authentication requirements. In an example embodiment, the user is required to enter a user name (e.g., 620) and a password, associated with that user name (e.g., 622), to access the repository.

Under the source configuration third section 606, the GUI provides information regarding a proxy over which the data is sent from the source connector to the target Network End Environment 104. According to an example embodiment, a user can select as to whether or not a proxy server is necessary or desirable for the specific application. If the user identifies that the proxy is to be implemented, the user then must identify via the GUI a proxy port name (e.g., 626) and a proxy port (e.g., 628).

Figure 7:
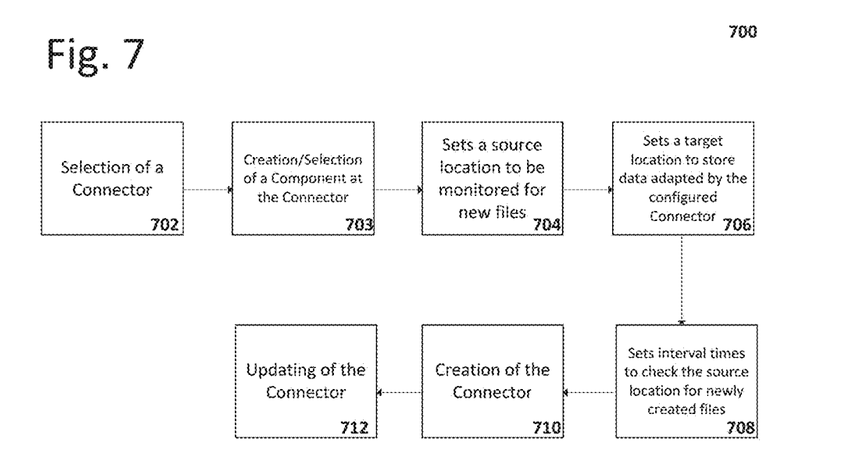
FIG. 7 illustrates a flowchart of a method 700 for configuring data received from a Device to interface with a Network End Environment according to an example embodiment.

FIG. 7 illustrates a flowchart of a method 700 for configuring data received from a Device to interface with a Network End Environment according to an example embodiment.

In a first step, 702, the user selects an edge component. In a second step, 703, the user creates and selects a component of the edge component. In a third step, 704, the user sets a source location remote to the edge component and hosted on a Network to be monitored for new files. In a fourth step, 706, the user sets a target location in the Network End Environment to store data adapted by the edge component once it is configured. In a fifth step, 708, the user sets configuration update interval check times for the selected edge component. In a sixth step, 710, the user creates the edge component. In a seventh step, 712, the user updates the edge component. In an example embodiment, steps 704, 706, and 708 together configure the specifics of a component of the edge component. According to an example embodiment, the edge component is a Connector and the component of the edge component is a component of the Connector. For the sake of clarity, the components of the edge components are referred to as subcomponents.

Figure 8:
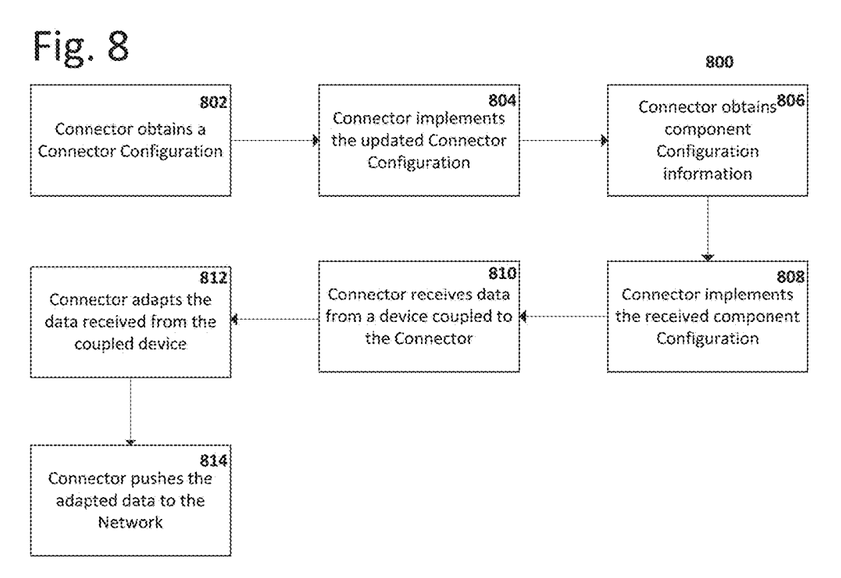
FIG. 8 illustrates a flowchart of a method 800 for updating an edge component configuration such that data received by the edge component from a Device can be read and transmitted to a Network End Environment.

FIG. 8 illustrates a flowchart of a method 800 for updating an edge component configuration such that data received by the edge component from a Device can be read and transmitted to a Network End Environment.

In a first step, 802, the edge component obtains a configuration from a Network End Environment 104. In an example embodiment, the obtained edge component configuration includes all configuration operations necessary to achieve the current configuration as it was stored in the Network End Environment 104. In an example embodiment, the updated edge component configuration is retrieved from the Core Device Configuration. In a second step, 804, the edge component implements the obtained edge component configuration. In a third step, 806, the edge component obtains component configuration information from the Network End Environment 104. In a fourth step, 808, the edge component implements the received component configuration. In a fifth step, 810, the edge component receives data from a device coupled to the edge component. In a sixth step, 812, the edge component adapts the data received from the coupled device. In an example embodiment, the edge component processes the adapted received data. In a seventh step, 814, the edge component pushes the data to the Network End Environment 104. In an example embodiment, the method includes a step where the edge component configuration received from the Network End Environment 104 is a delta configuration, which only provides operations necessary to update the current configuration. The device data is retrieved prior to retrieval of the edge component configuration. In an example embodiment, the edge component sends the Network End Environment 104 a configuration status update. In an example embodiment, the edge component sends the Network End Environment 104 a live status update. In an example embodiment, the edge component queries the Network End Environment 104 for component binaries. In an example embodiment, above referenced steps 802 and 806 are executed together prior to the implementation of the updated edge component Configuration in step 804. In an example embodiment, above referenced steps 804 and 806 are executed sequentially prior to the implementation of the updated edge component Configuration in step 804. According to an example embodiment, the edge component is a Connector and the component of the edge component is a component of the Connector. For the sake of clarity, the components of the edge components are referred to as subcomponents.

It should be appreciated that the present invention can be implemented in numerous ways, including as a process, an apparatus, a system, a computer processor executing software instructions, or a computer readable medium such as a non-transitory computer readable storage medium, or a computer Network wherein program instructions are sent over optical or electronic communication or non-transitory links. It should be noted that the order of the steps of disclosed processes can be altered within the scope of the invention, as noted in the appended claims and in the description herein.

Although the foregoing invention has been described in some detail for purposes of clarity of understanding, it will be apparent that certain changes and modifications can be practiced within the scope of the appended claims. The present invention can be practiced according to the claims and/or the embodiments without some or all of these specific details. Portions of the embodiments described herein can be used with or without each other and can be practiced in conjunction with a subset of all of the described embodiments. For the purpose of clarity, technical material that is known in the technical fields related to the invention has not been described in detail so that the present invention is not unnecessarily obscured. It should be noted that there are many alternative ways of implementing both the process and apparatus of the present invention. Accordingly, the present embodiments are to be considered as illustrative and not restrictive, and the invention is not to be limited to the details given herein, but can be modified within the scope and equivalents of the appended claims.

What is claimed is:

1. A system for configuring an edge component, the system comprising:
   the edge component having a configuration, the edge component being coupled to each of a device and a network backend system; and
   the network backend system having a source configuration used to update the configuration of the edge component,
   wherein:
      the configuration is implemented to adapt a data signal into a corresponding readable signal for storage on the network backend system;
      the configuration of the edge component is updated when the source configuration is changed;
      the edge component includes subcomponents comprising:
         a device adapter to adapt data received from the device to a readable form;
         a data processor to adjust the adapted data according to network requirements; and
         a network module to transmit the adjusted data to the network backend system; and
      the edge component obtains the configuration from a configuration portion of the network backend system by:
         providing, over the network module, a status update to the network backend system; and
         querying the configuration portion of the network backend system for at least one of: component binaries, at least one subcomponent configuration, and an edge component configuration, wherein the status update is status information from at least one of the edge component and the subcomponents.

2. The system as recited in claim 1, wherein an event bus provides bidirectional multi-channel connectivity between the device adapter, the data processor, and the network module.

3. The system as recited in claim 1, the network backend system comprising:
   a configuration portion having a workbench and a core device configuration;
   wherein the workbench has a user interface, and
   wherein the core device configuration includes the source configuration, and the core device messenger receives the readable signal for one of storage in the database and usage in the application.

4. An edge component comprising:
   a connector, having an updatable configuration, that receives a data signal from a device, the connector including:
   a first component comprising a device adapter, having an updatable configuration, to adapt the data signal into a corresponding readable signal for storage on a network;
   a second component comprising a network module, having an updatable configuration, to transmit the adapted data signal to the network for storage;
   a third component comprising a data processor for adjusting the adapted data signal; and
   an event bus for communicatively coupling the device adapter, the network module, and the data processor and transmitting messages among the first component, the second component, and the third component;
   wherein the connector queries a network backend system for updates to the connector, the first component, and the second component; and
   wherein upon an update notification from the network backend system the connector retrieves an updated configuration for at least one of the connector, the first component, and the second component for immediate integration into the connector.

5. The connector as recited in claim 4, wherein the updated configuration is one of a full configuration and a delta configuration, which includes only operations necessary to update the current configuration to the state available on the network backend system.

6. A method to configure an edge component, the method comprising:
   selecting an edge component;
   creating a subcomponent at the edge component;
   selecting the subcomponent at the edge component;
   setting a source location to be monitored by the edge component for at least one new file;
   providing a target location in which data adapted by the edge component is to be stored;

selecting an interval time at which the edge component is to check for the at least one new file at the source location; and updating the selected edge component;

wherein:
- a user interface is provided on the network backend system, and
- a user performs over the user interface at least one of:
  - the selecting the edge component;
  - the creating the subcomponent at the edge component;
  - the selecting the subcomponent at the edge component;
  - the setting the source location to be monitored by the edge component for at least one new file;
  - the providing the target location in which data adapted by the edge component is to be stored;
  - the selecting the interval time at which the edge component is to check for the eat least one new file at the source location; or
  - the updating the selected edge component.

7. The method as recited in claim 6, wherein the edge component configuration is updated according to one of a full configuration refresh and a delta configuration, which includes only operations necessary to update a current configuration to a state available on a network backend system.

8. A non-transitory computer readable storage device storing program instructions that, when executed, cause a processing device to perform a method for configuring an edge component and subcomponents of the edge component, the method comprising:

obtaining, from a core device configuration, an edge component configuration;

implementing the obtained edge component configuration;

obtaining, from the core device configuration, at least one configuration for a respective subcomponent; and implementing the obtained subcomponent configuration, wherein:
- at least one of the obtained edge component configuration and the obtained configuration for the respective subcomponent is a delta configuration, which includes a portion of a full configuration and the portion includes only new configuration elements;

the core device configuration is stored on a network backend system.

9. A method for configuring an edge component, the edge component having a configuration, the edge component being coupled to each of a device and a network backend system, the network backend system having a source configuration used to update the configuration of the edge component, the method comprising:

obtaining, by the edge component, the configuration from a configuration portion of the network backend system by:
- providing, over a network module, a status update to the network backend system; and
- querying the configuration portion of the network backend system for at least one of: component binaries, at least one subcomponent configuration, and an edge component configuration, wherein the status update is status information from at least one of the edge component and the subcomponents;

wherein:
- the configuration is implemented to adapt a data signal into a corresponding readable signal for storage on the network backend system;
- the configuration of the edge component is updated when the source configuration is changed;
- the edge component includes subcomponents comprising:
  - a device adapter to adapt data received from the device to a readable form;
  - a data processor to adjust the adapted data according to network requirements; and
  - the network module to transmit the adjusted data to the network backend system.

10. The method of claim 9, wherein an event bus provides bidirectional multi-channel connectivity between the device adapter, the data processor, and the network module.

11. The method of claim 9, the network backend system comprising:
- a configuration portion having a workbench and a core device configuration;
- wherein the workbench has a user interface, and
- wherein the core device configuration includes the source configuration, and the core device messenger receives the readable signal for one of storage in the database and usage in the application.

* * * * *